March 24, 1964

T. J. BLOCHER, JR 3,126,524

DATA STORAGE SYSTEM

Filed July 31, 1959

2 Sheets-Sheet 1

March 24, 1964 T. J. BLOCHER, JR 3,126,524
DATA STORAGE SYSTEM
Filed July 31, 1959 2 Sheets-Sheet 2
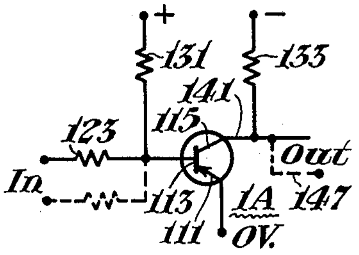
Fig. 2.
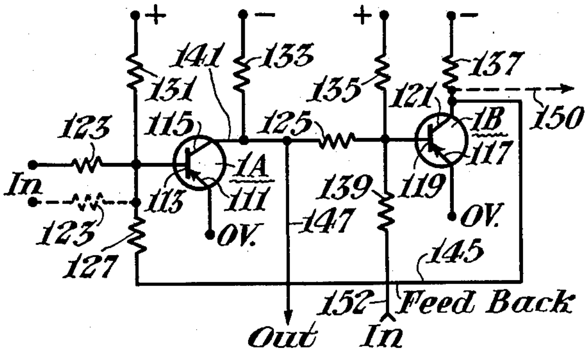
Fig. 3.
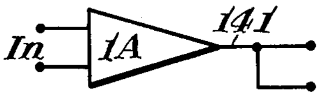
Fig. 2a.
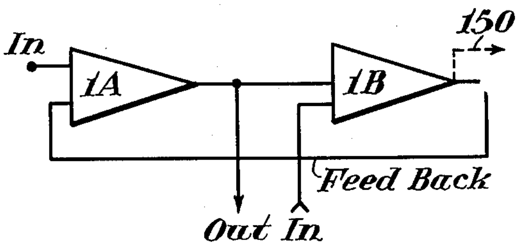
Fig. 3a.
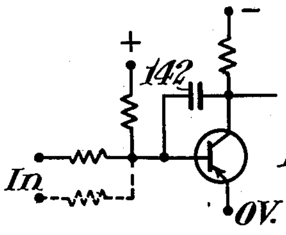
Fig. 4.
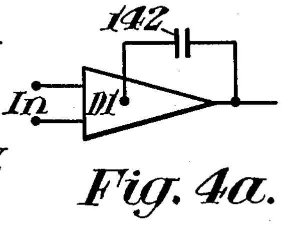
Fig. 4a.
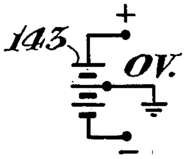
INVENTOR.
Thomas J. Blocher Jr.
BY W. L. Stout.
HIS ATTORNEY United States Patent Office 3,126,524
Patented Mar. 24, 1964

3,126,524

DATA STORAGE SYSTEM

Thomas J. Blocher, Jr., Monroeville, Pa., assignor to Westinghouse Air Brake Company, Wilmerding, Pa., a corporation of Pennsylvania Filed July 31, 1959, Ser. No. 830,759
5 Claims. (Cl. 340—173)

My invention relates to a data storage system, and more particularly to an improved electronic digital data storage system using transistor circuits.

Storage systems are utilized in a wide variety of data handling apparatus. One particular application for a storage system is as a sequential data storage as shown in the radiant energy detector system as described and claimed in the copending application for Letters Patent of the United States of Paul N. Bossart and Thomas J. Blocher, Jr., filed July 24, 1959, Serial No. 829,272, now abandoned, and assigned to the same assignee as the present invention.

The above radiant energy detector system poses the requirements for a storage system; first, that data be stored in binary form in various storage banks in the sequence received without using external gates or clock pulses in the storage system, second, that the storage banks in the storage system shift automatically, that is, transfer binary data from the first or input storage bank through the various storage banks to the last vacant storage bank automatically; third, that the circuits comprise as few basic circuits as possible; and fourth, thatt he storage system be capable of being expanded to virtually unlimited capacity without redesigning the components of the system.

Accordingly, it is a principal object of my invention to provide a storage system which receives binary data at an input or first storage bank and automatically transfers the data from the first bank through one or more banks to the last vacant bank.

It is another object of my invention to provide a storage system comprising a plurality of similar basic circuits.

It is another object of my invention to provide a storage system in which after the data is cancelled from the last storage bank, data in the preceding storage banks automatically cascades down to the last vacant storage banks.

It is another object of my invention to provide a storage system including checking circuits which prevent the system from receiving or shifting any additional data through the system if a storage bank is not functioning properly.

In the attainment of the foregoing objects, I provide a storage system including a plurality of storage banks, each bank having a plurality of storage registers. Transfer circuits transfer the input data from one storage bank to succeeding storage banks, and control circuits control the operation of said transfer circuits. Each of said storage banks, transfer circuits and control circuits are comprised of a pair of transistors having bi-stable conducting conditions.

Other objects and advantages of my invention will become apparent from the following description taken in connection with the accompanying drawings in which like reference characters refer to like elements throughout and in which:

FIG. 2 is a basic circuit used in the storage system; FIG. 2*a* is a block diagram of the circuit of FIG. 2;

FIG. 3 is a basic multivibrator circuit used in the storage system of FIG. 1; FIG. 3*a* is a block diagram of the circuit of FIG. 3;

FIG. 4 shows a slight modification of the circuit of FIG. 2 to provide a time delay; and FIG. 4*a* is a block diagram of the circuit of FIG. 4.

Figure 1:
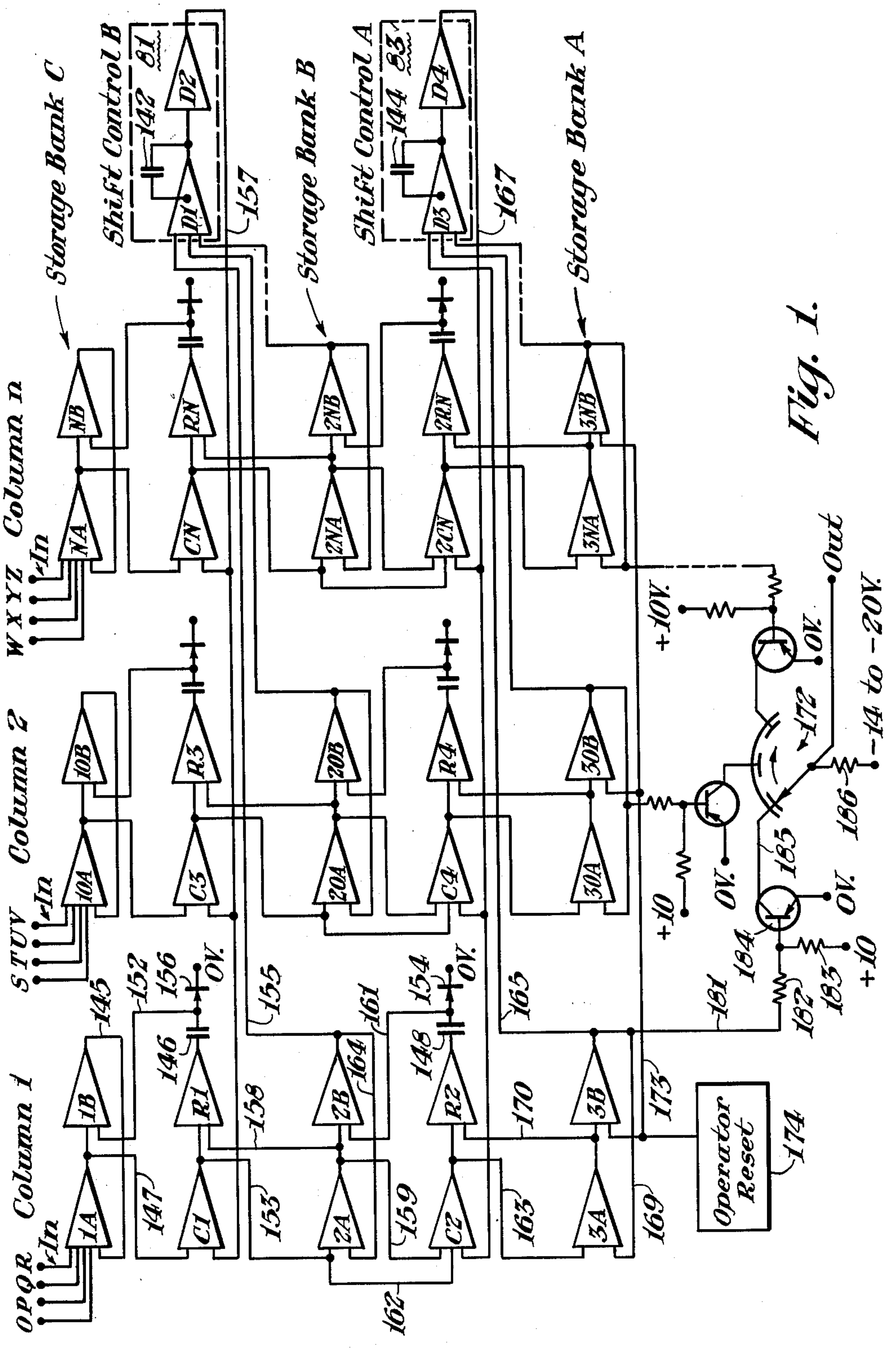
FIG. 1 is a block diagram of my storage system.

One embodiment of my storage system is shown in block diagram form in FIG. 1. Before describing the overall storage system, the various individual circuits as shown in FIGS. 2, 2*a*, 3, 3*a* and 4, 4*a* of which the system is comprised will be described.

A basic circuit employed in my system employs a junction transistor connected in common emitter configuration as an on-off switch, FIG. 2. P–N–P type transistors are shown in the drawings; however as is known, N–P–N type transistors may be used if the biasing polarities are reversed. One or more inputs labeled IN (four inputs are shown in FIG. 1) are connected through parallel connected resistors 123 to the base 113 of transistor 1A. One or more outputs from transistor 1A are taken from its collector 115 through lead 141. The biasing voltages are as follows: base 113 is connected through a resistor 131 to a positive potential, emitter 111 is connected to ground or 0 potential, and collector 115 is connected through resistor 133 to a negative potential.

A basic bi-stable circuit used in my system is shown in FIG. 3 and comprises a pair of transistors, each transistor is connected as in FIG. 2 and the output of one transistor is connected as an input to the other transistor. In the circuit of FIG. 3, an output from the collector 115 of transistor 1A is connected through lead 141 and a resistor 125 to the base 119 of transistor 1B. A second output from collector 115 is connected through lead 147 for purposes explained below. An output from collector 121 of transistor 1B is connected through lead 145 and a resistor 127 as a feedback voltage to the base 113 of transistor 1A and thus provides a bi-stable multivibrator. Another output from collector 121 may be connected through lead 150 for purposes explained below. The biasing voltages for transistor 1B are as follows: base 119 is connected through a resistor 135 to a positive potential, emitter 117 is connected to ground or zero potential and collector 121 is connected through resistor 137 to a negative potential.

The various biasing voltages to the transistors are obtained from a suitable source of energy indicated as a battery 143, shown in the drawing beneath FIG. 3 and having a tap connected to ground potential.

Transistor 1A is normally biased to cut off. When transistor 1A is cut off, the impedance between collector 115 and emitter 111 is extremely high and the source 143 sees the transistor essentially as an open circuit, so that the output is practically at the negative potential level of the source 143. When any of the input voltages are negative, the transistor switches or shifts from cut off to saturation. When transistor 1A is saturated, the impedance between collector 115 and emitter 111 is very low, so that the output is essentially connected to ground or zero potential. Thus, a negative voltage is obtained as an output from transistor 1A when there is a zero signal (no signal) at its input, and conversely a zero voltage or no output is obtained as an output from transistor 1A when a negative input signal is connected thereto.

It should be understood that the voltages coupled as inputs to transistor 1A through terminals OPQR are momentary negative direct current voltages which switch transistor 1A to saturation.

Transistor 1A functions in a similar manner as above when connected in the circuit of FIG. 3. Transistor 1B, as the other half of the bi-stable circuit, will obviously function identically to transistor 1A and is cut off when transistor 1A is conducting and is conducting when transistor 1A is cut off as will become apparent from the following description. For purposes of the following description, the first or initial conducting condition of each two-transistor circuit will be one in which the first transistor is cut off or non-conducting, and the second transistor is conducting; the second conducting condition of each two-transistor circuit will be one in which the first transistor is conducting and the second transistor is cut off or non-conducting.

As noted, a negative input signal to base 113 will cause a zero output from the collector 115 of transistor 1A which output is connected through lead 141 and resistor 125 to the base 119 of transistor 1B and causes 1B to cut off. The negative output signal from the collector 121 of transistor 1B is connected through lead 145 and resistor 127 as a feedback voltage to the base 113 of transistor 1A to provide a multivibrator circuit. The feedback voltage maintains the multivibrator in a second conducting condition to which it has been shifted by the negative input voltage to transistor 1A and thereby stores data. Another output from collector 121 is connected through lead 150 to other circuits in the system as will be explained below.

Zero and negative potentials will hereinafter also be designated as (0) and (—), respectively.

In the case when all the inputs to transistor 1A are at (0) potential, the output of transistor 1A which is a (—) potential is connected through lead 141 and resistor 125 to transistor 1B which in turn connects its (0) potential output through lead 145 and resistor 127 as a feedback voltage to transistor 1A to maintain the multivibrator in its initial or first conducting condition to which it is initially biased.

A (—) input connected through lead 152 and resistor 139 to the base 119 of transistor 1B will also cause 1B to have a (0) output on lead 150 and the (0) feedback voltage from transistor 1B to transistor 1A will maintain the multivibrator in its initial conducting condition.

It should be appreciated that a signal on any or all of the input leads to transistor 1A will cause the circuit including 1A and 1B to shift to a conducting condition in which a (0) output is obtained from output lead 147 and a (—) output is obtained from output lead 150. Conversely, a (0) input signal to all the input leads to transistor 1A will cause the circuit to shift to a conducting condition in which a (—) output is obtained from lead 147 and a (0) output is obtained from lead 150. Binary logic may obviously be expressed by assuming a negative signal input to transistor 1A designates a binary one (1) and a zero signal input (no input) designates a binary zero (0).

In order to facilitate the showing of my system the transistor circuits shown in FIGS. 2 and 3 have been indicated in block diagram form as shown in FIGS. 2*a* and 3*a*, respectively. For simplicity, the various biasing potentials and the input and output resistors are not shown. For purposes explained hereinbelow a delay is introduced into some of the transistor circuits in the system by a capacitor 142 connected from the collector to the base of a transistor to provide a feedback connection, as in FIG. 4. Again, for simplicity, in FIG. 4*a*, the circuit of FIG. 4 is shown as a block diagram form.

My storage system may comprise any number of storage banks. For simplicity in explanation only three, namely storage banks A, B and C are shown in FIG. 1. The banks form a plurality of rows and columns of individual bit processing circuits. Since the processing circuits in the various storage banks are similar in structure and operation, and since the various bit processing circuits operate essentially independently of one another, only the operation of one column of bit processing circuits need be described in detail for an understanding of my system. It should be appreciated that there may be any number of circuits or columns in each of the storage banks. Again, for simplicity in explanation only three columns of circuits, namely columns 1, 2 and *n* are shown in FIG. 1. Each of storage banks A, B and C will hereinafter also be referred to as A, B and C storages, respectively.

Storage register 1A, 1B comprises one bi-stable multivibrator as shown in FIGS. 3 and 3*a*. Likewise, each of storage registers 2A, 2B and 3A, 3B are bistable multivibrators identical to multivibrator 1A, 1B. Transfer circuits C1, R1, and C2, R2 are also similar to register 1A, 1B but do not have the feedback connection from the second transistor to the first transistor. Transfer control circuits D1, D2 and D3, D4 are also similar to 1A, 1B but in addition include a capacitor 142 and 144, respectively in the first transistor in the circuit, as shown in FIGS. 4 and 4*a*. Circuits D1, D2 and D3, D4 also do not have a feedback connection.

Initially storage registers 1A, 1B; 2A, 2B; 3A, 3B; and, transfer control circuits D1, D2; D3, D4 are biased to be in an initial conducting condition or state (0—0); and, C1, 1, and C2, R2 are in a second conducting condition or state (—0—); wherein the first symbol designates the input to the first transistor in each circuit, while the second symbol designates an output from the first transistor and an input to the second transistor in each circuit, and the third symbol designates an output from the second transistor. Transfer circuits C1, R1 and C2, R2, although biased to an initial conducting condition, are in state (0—0) due to the (—) input to C1 and C2 from 1A and 2A, respectively. A (—) symbol indicates a negative voltage input while a (0) symbol indicates a zero voltage input.

The operation of my storage system will now be described.

Assume, that a binary 1 is to be stored in the storage in the storage register 1A, 1B of the storage system by shifting 1A, 1B to conducting condition (—0—). A momentary negative voltage is coupled to transistor 1A through at least one of the terminals OPQR to transistor 1A. The various operational steps are:

(1) Register 1A, 1B shifts to (—0—). The negative (—) feedback voltage from 1B to 1A through lead 145 maintains 1A, 1B in conducting condition (—0—), even though the momentary negative input voltage to 1A may have terminated.

(2) The (0) output from 1A through lead 147 to C1 causes transfer circuit C1, R1 to shift to (0—0). Diode 156, having its anode connected to capacitor 146 and its cathode connected to ground or zero potential, permits the capacitor to discharge rapidly to zero potential when the output of R1 shifts to (0); the capacitor discharge has no effect on 1B, and therefore causes no change in register 1A, 1B.

(3) The (—) output from C1 through lead 153 causes register 2A, 2B to shift to (—0—). The (—) output from C1 is also connected through leads 153 and 162 to C2 to prevent C2, R2 from shifting even though storage bank A may be empty. This assures that an orderly sequential stepping action occurs.

(4) The (—) output from 2B is connected through lead 155 to a shift or transfer control circuit B, numbered 81, comprising circuit D1, D2. With a (—) input, control circuit D1, D2 shifts to (—0—) after time delay determined by capacitor 142. The time delay provided by capacitor 142 delays the shifting of circuit D1, D2 such that the change in output connected from D2 through lead 157 to C1, C3 and CN is delayed to compensate for any variations in the circuit parameters of the various columns to assure the transfer of data from all the registers in storage bank C to the associated registers in storage bank B is maintained synchronized. Transistor D1, having the capacitor 142 connected as shown in detail in FIG. 4, requires that a transistor such as D2, connected as shown in FIG. 2, be connected thereafter, since the output of D1 tends to be an exponentially rising or falling pulse and D2 is required to square the wave front. In addition the inversion of the voltage is necessary to provide an output corresponding to the input to circuit D1, D2.

(5) The (—) output from D2 connected through lead 157 to C1, causes circuit C1, R1 to shift to (—0—).

(6) As R1 shifts to a non-conducting condition, a negative (—) transient voltage or pulse is developed at the output of R1 which pulse is coupled through capacitor 146 to register 1A, 1B, and 1A, 1B is shifted or reset to its initial condition of (0—0) to clear said register of input data.

Lead 158 checks that register 2A, 2B has shifted to (—0—). If register 2A, 2B does not, for any reason, shift to (—0—), and remains as (0—0), lead 158 connects a (—) voltage from 2A to R1 which in turn will couple a (0) output to 1B. Since a steady state (—) voltage is now connected to R1 neither a (0) or (—) transient input to R1 will cause a change in the R1 conducting condition. Capacitor 146 will block any direct current voltage. Thus, since R1 can not shift its non-conducting state to provide a negative pulse to reset 1B, register 1A, 1B can not shift out the binary 1 stored therein. A circuit similar to shift controls A and B could be used to indicate to the input system that storage bank C still contains stored data which might be utilized to provide an inhibit signal to jam the system to show it is not operating properly.

(7) The (0) output from C1 connected through lead 153 to 2A causes no change in register 2A, 2B since the negative feedback from 2B through lead 157 to 2A maintains register 2A, 2B in state (—0—).

(8) The (0) output from 2A connected through lead 159 to C2 causes circuit C2, R2 to shift to (0—0). Diode 154, connected similarly as diode 156, functions to permit capacitor 148 to discharge to zero potential when the output of R2 shifts to (0); the capacitor discharge has no effect on 2B, and therefore causes no change in register 2A, 2B.

(9) The (—) output from C2 connected through lead 163 to 3A causes register 3A, 3B to shift to (—0—).

(10) The (—) output from 3B connected through lead 165 to a shift control A, numbered 83 and comprising circuit D3, D4, causes D3, D4, after a time delay determined by capacitor 144, to shift to (—0—).

(11) The (—) output from D4 connected through lead 167 to C2 causes circuit C2, R2 to shift to (—0—).

(12) The (—) output pulse developed as R2 shifts to its non-conducting condition is coupled through capacitor 148 and lead 161 to 2B to reset register 2A, 2B to (0—0) to clear said register of input data. Lead 170 checks that 3A, 3B has set to (—0—) in a similar manner as discussed above in connection with lead 158.

(13) At this point, (0) output from C2 connected through lead 163 to 3A causes no change in register 3A, 3B since the (—) feedback from 3B through lead 169 to 3A maintains register 3A, 3B in conducting condition (—0—), that is, stores a binary 1 in storage bank A.

Assume it is next desired to store a binary 1 in register 2A, 2B. A second momentary (—) voltage input is coupled to transistor 1A through at least one of the terminals OPQR. The various operational steps are:

(1) Register 1A, 1B shifts to (—0—). The (—) feedback from 1B to 1A connected through lead 145 maintains 1A, 1B in conducting condition (—0—).

(2) The (0) output from 1A connected through lead 147 causes circuit C1, R1 to shift to (0—0). As above, diode 156 permits capacitor 146 to discharge to zero potential; the capacitor discharge has no effect on 1B, and therefore causes no change in register 1A, 1B.

(3) The (—) output from C1 connected through lead 153 to 2A causes register 2A, 2B to shift to (—0—).

(4) The (0) output from 2A connected through lead 159 to C2 causes no change in circuit C2, R2 since the (—) output from D4 connected through lead 167 to C2 maintians circuit C2, R2 at (—0—). As will be appreciated control circuit D3, D4 is in state (—0—) due to the fact that a binary 1 is stored in register 3A, 3B. Shift control A comprising D3, D4 thus provides an inhibit voltage to circuit C2, R2 to prevent additional transfer of data to storage bank A. Lead 167 connects the output of D4 in parallel to C2, C4 and 2CN, and thus once a binary 1 is stored in any of the registers in storage bank A no additional data can be entered into the other registers of storage bank A. This assures that a (0) or no input to any of the registers in a storage bank functions as an intelligible bit of each code.

(5) Capacitor 148 blocks the negative direct current voltage output of R2 from affecting 2B.

(6) The (—) output from 2B connected through lead 155 to D1 causes circuit D1, D2, after time delay determined by capacitor 142, to shift to (—0—).

(7) The (—) output from D2 connected through lead 157 to C1 causes circuit C1, R1 to shift to (—0—).

(8) The (—) pulse developed as R1 shifts to its non-conducting condition is coupled through capacitor 146 and lead 152 to 1B to cause register 1A, 1B to reset to (0—0) to clear 1A, 1B of data.

(9) At this point register 3A, 3B in storage bank A and register 2A, 2B in storage bank B both have a binary 1 stored therein.

Assume it is next desired to store a binary 1 in register 1A, 1B. A third momentary negative (—) voltage is coupled to transistor 1A through at least one of the terminals OPQR.

(1) Register 1A, 1B shifts to (—0—). The negative feedback from 1B through lead 145 to 1A maintains register 1A, 1B in conducting condition (—0—).

(2) The (0) output from 1A connected through lead 151 to C1 causes no change in circuit C1, R1 since the (—) input from D2 maintains C1, R1 at (—0—). Thus, shift control B provides an inhibit voltage to circuit C1, R1 to prevent additional transfer of data to storage bank B, for purposes as described above in connection with shift control A.

(3) There is no input from R1 through lead 152 to 1B since capacitor 146 blocks any direct current voltage.

(4) At this point, register 3A, 3B in storage bank A; 2A, 2B in storage bank B; and 1A, 1B in storage bank C all have a binary 1 stored therein.

The input to the registers in storage bank C, namely, 1A, 1B; 10A, 10B; and NA, NB is concurrent. As noted above, the output of D2 is connected by lead 157 in parallel to C1, C3 and CN. Likewise, the output of D4 is connected by lead 167 in parallel to C2, C4 and 2CN. The delay characteristics in circuits D1, D2 and D3 and D4 maintain the transfer operations between the various registers in each of the three storage banks synchronized, and compensate for any variations in the time required to transfer a code bit from the circuits in one storage bank to the circuits in the next lower or succeeding storage bank.

The output of each of the storage units in storage bank A is connected through an associated output amplifier to a utilization circuit. A rotary type contact switch 172 sequentially connects the output from each of the registers 3A, 3B; 30A, 30B; and 3NA, 3NB through to an output line to a utilization circuit as discussed in the above referred to copending application of Paul N. Bossart and Thomas J. Blocher, Jr.

An output from register 3A, 3B is connected through lead 181 and resistor 182 to the associated amplifier 184 which is similarly biased as is shown in FIG. 2 with its base connected through a resistor 183 to a positive potential, its emitter connected to zero potential and its collector connected through line 185 and resistor 186 to a negative potential. A negative output from register 3A, 3B causes amplifier 184 to conduct providing essentially a zero potential to output line 185 and the associated contact of rotary switch 172. Likewise, when the output from register 3A, 3B is zero, amplifier 184 will be cut off and a negative potential will be connected to the output line 185 through the associated contact of rotary switch 172.

After the information from storage bank A is read out, a cancel or reset voltage may be applied to reset storage bank A to its initial condition. To reset storage blank A, a momentary negative voltage is applied from an operator reset stage 174 through a lead 173 to the second transistor of each of the registers in storage bank A. The negative voltage connected to the second transistor of each of the registers in storage bank A will reset or shift these registers to (0—0).

The following sequence of steps will occur to automatically cascade the stored data to the last empty storage register.

Upon receiving an operator reset voltage all the storage registers in storage bank A will now provide a (0) output to D3, and shift control A will reset to (0—0). The (0) output from D4 connected through lead 167 to C2, C4 and 2CN will tend to reset transfer circuits C2, R2; C4, R4; and 2CN, 2RN to (0—0). Assume for example, at this point that register 2A, 2B has a binary 1 stored therein, that is, it is in state (—0—). The (0) output from D4 and a (0) output from 2A connected through lead 159 to C2 will permit C2, R2 to shift to (0—0). A (—) output connected from C2 through lead 163 to 3A will shift register 3A, 3B to (—0—), that is, store a binary 1 therein. A (—) output from 3B connected through lead 165 to D3 will reset shift control A to (—0—). A (—) output from D4 connected through lead 167 to C2 will shift circuit C2, R2 to (—0—). A (—) output pulse developed as R2 shifts is connected through lead 161 to 2B to reset register 2A, 2B to its initial condition of (0—0).

The sequence of steps is repeated for storage registers 1A, 1B and 2A, 2B. Assume, for example, that storage register 1A, 1B also has a binary 1 stored therein, that is, it is in state (—0—). Once 2A, 2B is reset to (0—0), the (0) output connected from 2B through lead 155 to D1 will cause shift control B to reset to (0—0). A (0) output from D2 is connected through lead 157 as an input to C1. Also, a (0) output from 1A is connected through lead 147 as a second input to C1. The two (0) inputs to C1 will reset transfer circuit C1, R1 to (0—0). A (—) output from C1 connected through lead 153 to 2A will shift register 2A, 2B to (—0—), that is, store a binary 1 therein. A (—) output from 2B connected through lead 155 to D1 will reset shift control A to (—0—). A (—) output from D2 connected through lead 157 to C1 will shift circuit C1, R1 to (—0—). A (—) output pulse developed as R1 shifts is connected through capacitor 146 and lead 152 to 1B to reset register 1A, 1B to its initial condition of (0—0).

If, however, when storage register 3A, 3B is reset, storage register 2A, 2B is vacant, that is, it is in state (0—0); a (—) output from 2A is connected through lead 159 to C2 and transfer circuit is in state (—0—). The (0) output from C2 is in turn connected through lead 163 to 3A and register 3A, 3B remains in its initial state (0—0), that is, with no binary 1 stored therein or vacant. The same steps occur between registers 1A, 1B and 2A, 2B if 1A, 1B is vacant when register 2A, 2B resets to its initial condition.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. A storage system for storing a binary data comprising, in combination, a plurality of storage banks each of said banks including a plurality of storage registers, each of said storage registers comprising a multivibrator biased to have bi-stable conducting conditions, means connecting binary data input signals to each of said multivibrators for controlling its conducting condition, means connecting a feedback voltage from the output to the input of each of said multivibrators for maintaining a multivibrator in the conducting condition to which it has been controlled and thereby storing data, transfer means for said storage registers for transferring data from storage registers in one storage bank to storage registers in a succeeding storage bank, a plurality of control means having bi-stable conducting conditions, means biasing said control means to an initial conducting condition, one control means connected in parallel to the transfer means associated with a storage bank, the output of each storage register in each bank being connected in parallel to said control means, a storage register having data stored therein providing an output to shift said control means to its second conducting condition, and said control means when in its second conducting condition providing an output to said transfer means to inhibit the transfer of additional data to any storage register in a storage bank having a storage register in which data is stored.

2. A data storage system comprising, in combination, a plurality of storage registers for storing binary data, a plurality of transfer means for said storage registers, and a plurality of control means for said transfer means, said storage registers, said transfer means and said control means each comprising first and second transistors connected to provide circuits having bi-stable conducting conditions, means biasing said circuits to an initial conducting condition, means connecting binary input signals to the first transistor of a first of said storage registers for controlling the conducting condition of said first register, in each register means connecting the output of the second transistor as a feedback voltage to the first transistor for maintaining said register in the conducting condition to which it has been controlled and thereby storing data, means connecting the output of the first transistor of a first of said storage registers as an input to the first transistor of a first of said transfer means for controlling the conducting condition of said first transfer means, capacitor means for connecting the output of said second transistor of said first transfer means as an input to the second transistor or said first storage register for coupling any transient output developed as said first transfer means changes conducting conditions for resetting said first storage register to an initial condition, means connecting the output of said first transistor in said transfer means as an input to the first transistor of a succeeding storage register for controlling the conducting condition of said succeeding register and thus transferring data thereto, means connecting the output of the second transistor in said succeeding storage register to a first of said control means, and means connecting the output of said first control means as an input to the first transistor of said first transfer means for inhibiting said first transfer means from changing its conducting condition while said succeeding storage register has an input signal stored therein.

3. A data storage system comprising, in combination, a plurality of storage banks each having a plurality of storage registers for storing binary data, a plurality of transfer means for said storage registers, and a plurality of control means for said transfer means; said storage registers, said transfer means and said control means each comprising first and second transistors connected to provide a circuit having bi-stable conducting conditions, means biasing said transistors to an initial conducting condition, means connecting a binary input signal to the first transistor of the storage registers of said first storage bank for controlling the conducting condition of said registers, means connecting the output of the second transistor of each storage register as a feedback voltage to the first transistor of the respective storage register for maintaining said register in the conducting condition to which it has been controlled and thereby storing data, means connecting the output of said first transistor in a storage register as an input to the first transistor of a first of said transfer means for controlling the conducting condition of said first transfer means, capacitor means for connecting the output of said second transistor of said first transfer means as an input to said second transistor of said first storage register for coupling any transient output developed as said first transfer means changes conducting conditions for resetting said first storage register to an initial condition, means connecting the output of said first transistor in said transfer means as an input to the first transistor of a succeeding storage register for controlling the conducting condition of said succeeding register and thus transferring data thereto, means connecting the output of each of the second transistors of said storage registers in said succeeding storage bank to a first of said first control means, and means connecting the output of said first control means as an input to each of the first transistors of said first transfer means for inhibiting said first transfer means from changing its conducting condition while said succeeding storage register has an input signal stored therein.

4. A storage system for storing a binary data comprising, in combination, a plurality of storage banks each of said banks including a plurality of storage registers, each of said storage registers comprising a multivibrator biased to have bi-stable conducting conditions, means connecting input binary data signals to each of said multivibrators for controlling its conducting condition, means connecting a feedback voltage from the output to the input of each of said multivibrators for maintaining a multivibrator in the conducting condition to which it has been controlled and thereby storing data, transfer means for each of said storage registers for transferring data from storage registers of a storage bank to the storage registers of a succeeding storage bank, a plurality of control means each comprising a circuit having bi-stable conducting conditions and being biased to an initial conducting condition, means connecting the output of the storage registers in a storage bank in parallel to one of said control means, means connecting the output of one control means in parallel as inputs to the transfer means associated with one storage bank, a storage register having data stored therein providing an output to shift said control means to a second conducting condition, said control means when in its second conducting condition providing an output to said transfer means to inhibit the transfer of additional data to any storage register in the storage bank having a storage register with stored data, and time delay means connected to said control means for delaying the shifting of said control means whereby the change in output from said control means is delayed for assuring the transfer of data from the various storage registers in a storage bank to the various storage registers in a succeeding bank is synchronized.

5. A data storage system comprising, in combination, a plurality of storage banks each having a plurality of storage registers for storing binary data; a plurality of transfer means for said storage registers; and a plurality of control means for said transfer means; said storage registers, said transfer means, and said control means each comprising first and second transistors connected to provide a circuit having bi-stable conducting conditions; means biasing said circuits to an initial conducting condition; means connecting a binary input signal to the first transistor of a first of said storage registers of a first of said storage banks for controlling the conducting condition of said registers; means connecting the output of the second transistor of each storage register as a feedback voltage to the first transistor of the respective storage register to maintain said register in the conducting condition to which it has been controlled and thereby storing data; means connecting the output of said first transistor in a storage register as an input to the first transistor of a first of said transfer means; capacitor means for connecting the output of said second transistor of said first transfer means as an input to said second transistor of said first storage register for coupling any transient output developed as said first transfer means changed conducting conditions for resetting said first storage register to an initial condition, means connecting the output of said first transistor in said first transfer means as an input to the first transistor of a succeeding storage register for controlling the conducting condition of said succeding register and thus transferring data thereto, means connecting the output of the first transistor in said first transfer means as an input to the first transistor of the succeeding transfer means for insuring a stepped transfer of data between said first and succeeding registers, means connecting the output of each of the second transistors of said storage registers in said succeeding storage bank to a first control means, means connecting the output of said first control means as an input to each of the first transistors of said first transfer means for inhibiting said first transfer means from shifting its conducting condition while said second storage register has an input signal stored therein, and capacitor means for said control means for delaying the shifting of said control means whereby the change in output from said control means to said transfer means is delayed for assuring the transfer of data from the various storage registers in a storage bank to the associated storage registers in a succeeding bank is maintained synchronized.

References Cited in the file of this patent

UNITED STATES PATENTS

| | | |
|---|---|---|
| 2,531,076 | Moore | Nov. 21, 1950 |
| 2,785,304 | Bruce et al. | Mar. 12, 1957 |
| 2,842,682 | Clapper | July 8, 1958 |
| 2,881,412 | Loev | Apr. 7, 1959 |
| 2,985,835 | Stuart | May 23, 1961 |

OTHER REFERENCES

Richards, Digital Computer Components and Circuits; D. Van Nostrand Company, Inc., Princeton, 1957; pages 160–164.